US010619820B2

(12) United States Patent
Salter et al.

(10) Patent No.: US 10,619,820 B2
(45) Date of Patent: Apr. 14, 2020

(54) ILLUMINATING VEHICLE ASSEMBLIES WITH ILLUMINATED BADGES

(71) Applicant: FORD GLOBAL TECHNOLOGIES, LLC, Dearborn, MI (US)

(72) Inventors: Stuart C. Salter, White Lake, MI (US); Paul Kenneth Dellock, Northville, MI (US); Jeffrey Singer, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/284,104

(22) Filed: Feb. 25, 2019

(65) Prior Publication Data

US 2019/0186709 A1 Jun. 20, 2019

Related U.S. Application Data

(62) Division of application No. 15/625,046, filed on Jun. 16, 2017, now Pat. No. 10,267,481.

(51) Int. Cl.
| | |
|---|---|
| *F21S 45/00* | (2018.01) |
| *B60Q 1/28* | (2006.01) |
| *B60Q 1/50* | (2006.01) |
| *F21S 43/19* | (2018.01) |
| *F21S 45/48* | (2018.01) |
| *F21S 43/15* | (2018.01) |
| *F21S 43/14* | (2018.01) |
| *B60Q 1/26* | (2006.01) |
| *B60R 13/00* | (2006.01) |
| *F21V 23/00* | (2015.01) |
| *G09F 13/04* | (2006.01) |

(Continued)

(52) U.S. Cl.
CPC ............ *F21S 45/00* (2018.01); *B60Q 1/2696* (2013.01); *B60Q 1/28* (2013.01); *B60Q 1/50* (2013.01); *B60R 13/005* (2013.01); *F21S 43/14* (2018.01); *F21S 43/15* (2018.01); *F21S 43/19* (2018.01); *F21S 45/48* (2018.01); *F21V 23/003* (2013.01); *G09F 13/0404* (2013.01); *B60Q 2400/20* (2013.01); *B60Q 2400/40* (2013.01); *F21W 2103/00* (2018.01); *F21W 2111/00* (2013.01); *G09F 2013/044* (2013.01)

(58) Field of Classification Search
None
See application file for complete search history.

(56) References Cited

U.S. PATENT DOCUMENTS

| | | | |
|---|---|---|---|
| 4,977,695 | A | 12/1990 | Armbruster |
| 9,481,296 | B2 | 11/2016 | Roberts et al. |

(Continued)

FOREIGN PATENT DOCUMENTS

| | | |
|---|---|---|
| DE | 102011113913 A1 | 3/2013 |
| DE | 202016105406 U1 | 10/2016 |

(Continued)

*Primary Examiner* — Ashok Patel
(74) *Attorney, Agent, or Firm* — David Coppiellie; Carlson, Gaskey & Olds

(57) ABSTRACT

An illuminating vehicle assembly includes a plastic grille component and a badge mounted to the plastic grille component. The badge houses at least one light source. The light source may be illuminated to create various lighting effects. Any heat generated by the at least one light source can be dissipated into the plastic grille component.

20 Claims, 7 Drawing Sheets

(51) Int. Cl.
*F21W 103/00* (2018.01)
*F21W 111/00* (2006.01)

(56) References Cited

U.S. PATENT DOCUMENTS

| | | | |
|---|---|---|---|
| 2010/0195348 A1* | 8/2010 | Ohtsuka | B60Q 3/51 |
| | | | 362/546 |
| 2013/0335997 A1 | 12/2013 | Roberts et al. | |
| 2014/0153220 A1* | 6/2014 | Gierens | F21V 29/70 |
| | | | 362/92 |
| 2014/0184068 A1 | 7/2014 | Kwon | |
| 2014/0247614 A1 | 9/2014 | Roberts et al. | |
| 2014/0369060 A1* | 12/2014 | Zhang | F21V 9/08 |
| | | | 362/542 |
| 2015/0239390 A1 | 8/2015 | Oliverio et al. | |
| 2015/0241016 A1 | 8/2015 | Sura et al. | |
| 2017/0043709 A1 | 2/2017 | Dellock et al. | |

FOREIGN PATENT DOCUMENTS

| | | |
|---|---|---|
| JP | 5951391 B2 | 7/2016 |
| KR | 20090019115 A | 2/2009 |

* cited by examiner

ILLUMINATING VEHICLE ASSEMBLIES WITH ILLUMINATED BADGES

CROSS-REFERENCE TO RELATED APPLICATIONS

This is a divisional of U.S. patent application Ser. No. 15/625,046, which was filed on Jun. 16, 2017.

TECHNICAL FIELD

This disclosure relates to an illuminating vehicle assembly. An exemplary illuminating vehicle assembly includes an illuminated badge adapted to indicate a plurality of visually distinctive operating behaviors of the vehicle.

BACKGROUND

Vehicles can include various decorative assemblies, such as badges, that help to identify a model of the vehicle. Some vehicles, particularly luxury vehicles, may be equipped with one or more illuminating assemblies for increasing the aesthetic appearance of the vehicle.

SUMMARY

An illuminating vehicle assembly according to an exemplary aspect of the present disclosure includes, among other things, a plastic grille component and a badge mounted to the plastic grille component and housing at least one light source. Heat generated by the at least one light source is dissipated into the plastic grille component.

In a further non-limiting embodiment of the foregoing illuminating vehicle assembly, a control module is configured to control the at last one light source to emit combinations of lighting effects from the badge for indicating a plurality of visually distinctive operating behaviors of the vehicle.

In a further non-limiting embodiment of either of the foregoing illuminating vehicle assemblies, the plurality of visually distinctive operating behaviors are visually distinctive in terms of at least color and brightness.

In a further non-limiting embodiment of any of the foregoing illuminating vehicle assemblies, the badge includes a housing, the at least one light source, and at least one optic device.

In a further non-limiting embodiment of any of the foregoing illuminating vehicle assemblies, the housing includes a metallic film secured to a plastic section.

In a further non-limiting embodiment of any of the foregoing illuminating vehicle assemblies, a printed circuit board (PCB) is located between the housing and the plastic grille component.

In a further non-limiting embodiment of any of the foregoing illuminating vehicle assemblies, a thermal transfer device is mounted between the PCB and the plastic grille component.

In a further non-limiting embodiment of any of the foregoing illuminating vehicle assemblies, the at least one light source is a light emitting diode (LED).

In a further non-limiting embodiment of any of the foregoing illuminating vehicle assemblies, the LED is a multi-colored LED.

In a further non-limiting embodiment of any of the foregoing illuminating vehicle assemblies, the badge is mounted to an external surface of the plastic grille component and a control module is received within a compartment located at an internal surface of the plastic grille component.

In a further non-limiting embodiment of any of the foregoing illuminating vehicle assemblies, the plastic grille component is a grille bar.

A method according to another exemplary aspect of the present disclosure includes, among other things, illuminating a badge of an illuminating assembly of a vehicle and dissipating heat produced by the badge into a plastic component of a grille assembly of the vehicle.

In a further non-limiting embodiment of the forgoing methods, illuminating the badge includes producing a lighting effect that provides a visual indication of a traveling speed of the vehicle.

In a further non-limiting embodiment of either of the foregoing methods, illuminating the badge includes producing a lighting effect to produce a daytime running light of the vehicle.

In a further non-limiting embodiments of any of the foregoing methods, illuminating the badge includes producing a lighting effect to indicate a traction or stability control issue of the vehicle.

In a further non-limiting embodiments of any of the foregoing methods, illuminating the badge includes producing a lighting effect to illuminate openings in the grille assembly.

In a further non-limiting embodiments of any of the foregoing methods, illuminating the badge includes producing a lighting effect to simulate a temperature gauge for indicating an engine temperature of the vehicle.

In a further non-limiting embodiments of any of the foregoing methods, illuminating the badge includes producing a lighting effect to indicate that a vehicle issue exists.

In a further non-limiting embodiments of any of the foregoing methods, illuminating the badge includes producing a lighting effect to indicate whether doors of the vehicle are locked or unlocked.

In a further non-limiting embodiments of any of the foregoing methods, the plastic component is a grille bar.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details various illuminating vehicle assemblies. An exemplary illuminating vehicle assembly includes a plastic grille component and a badge mounted to the plastic grille component. The badge may be controlled to emit various lighting effects for indicating a plurality of visually distinctive operating behaviors of a vehicle. The plastic grille component dissipates any heat generated by light sources of the badge while emitting the lighting effects. These and other features of this disclosure are described in greater detail below.

Figure 1:
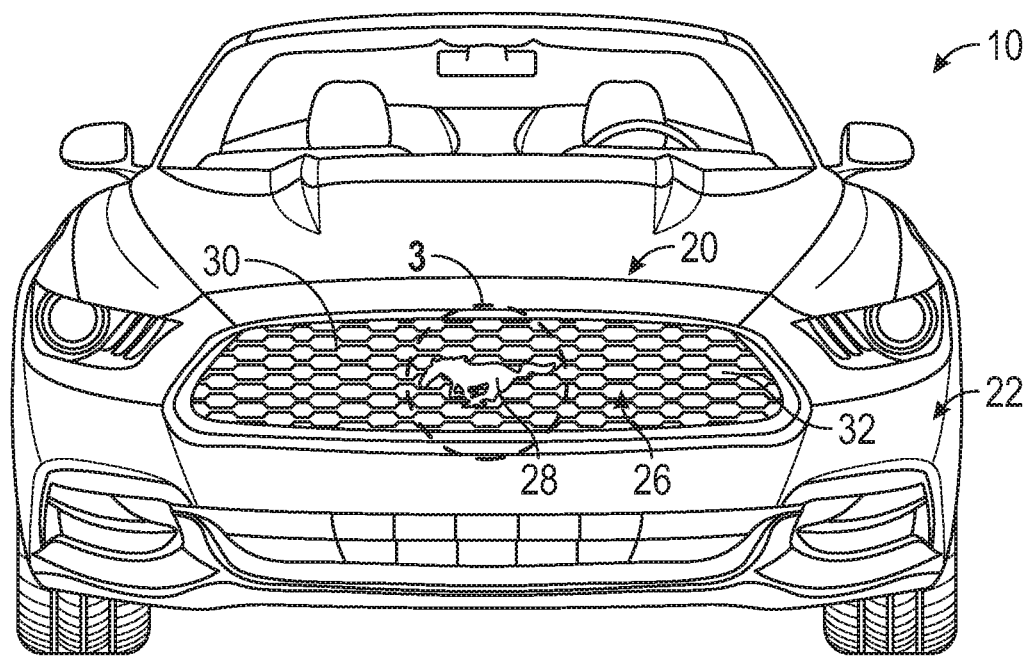
FIG. 1 illustrates a vehicle equipped with an illuminating assembly.

FIG. 1 schematically illustrates a vehicle 10. The vehicle 10 may be a car, a truck, a van, a sport utility vehicle, or any other type of vehicle. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

Figure 2:
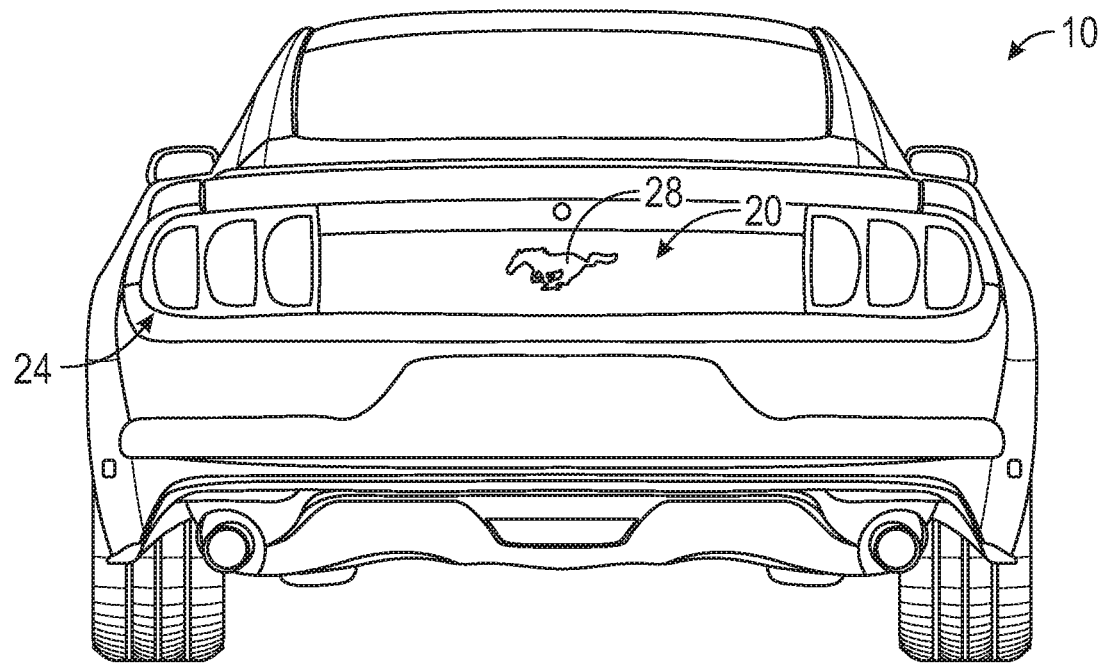
FIG. 2 illustrates another exemplary illuminating assembly for a vehicle.

The vehicle 10 may be equipped with an illuminating assembly 20. The illuminating assembly 20 is generally positioned on an exterior front portion 22 of the vehicle 10 (see FIG. 1), on an exterior rear portion 24 of the vehicle 10 (see FIG. 2), or both. Although an illuminating assembly for the front portion 22 and/or rear portion 24 of the vehicle 10 is described herein, illuminating assemblies positioned in other vehicle locations could be similarly configured.

In an embodiment, the illuminating assembly 20 includes a grille assembly 26 and a badge 28 mounted to a portion of the grille assembly 26. The grille assembly 26 may include a plurality of grille components 30. In an embodiment, the grille components 30 include grille bars arranged in a spaced relationship relative to one another. In another embodiment, the grille components 30 includes grille bars arranged to include a woven or crosshatched configuration. The grille components 30 could be arranged to embody any grille configuration within the scope of this disclosure.

The arrangement of the grille components 30 establishes gaps or openings 32 through the grille assembly 26. Air may enter the engine compartment of the vehicle 10 through the openings 32 for cooling various parts, such as the engine and the radiator, for example. The air passing through the openings 32 may additionally be used to cool the badge 28.

The badge 28 may help identify the make and/or model of the vehicle 10. Badges, in contrast to many vehicle trim components, can identify a brand of the vehicle 10. The badge 28 can be a logo, symbol, word, or any combination of these. In addition, the badge 28 can include any desired size, shape, and design. It should therefore be understood that this disclosure is not limited to the specific "pony" badge design shown in FIGS. 1, 2, and 3.

The badge 28 may be mounted to or is an integral component of the grille assembly 26. In an embodiment, the badge 28 is mounted to one or more of the grille components 30 of the grille assembly 26. Separate from their various other utilities, the grille assembly 26 and the badge 28 function as styling elements for enhancing the appearance of the vehicle 10.

The badge 28 of the illuminating assembly 20 can be selectively controlled to create a combination of lighting effects (e.g., in terms of color, brightness, flashing, pulsing, etc.) that provide visual feedback of various operating behaviors of the vehicle 10 to the vehicle owner, pedestrians and/or operators of other vehicles. As will be discussed below in greater detail, the badge 28 of the illuminating assembly 20 can be configured to emit light to create a combination of lighting effects for communicating information to the vehicle owner, pedestrians, and/or other vehicle operators. In an embodiment, if mounted at the front portion 22 of the vehicle 10, the badge 28 provides visual feedback to the front of the vehicle 10 (see, e.g., FIG. 1). In another embodiment, if mounted at the rear portion 24 of the vehicle 10, the badge 28 provides visual feedback to the rear of the vehicle 10 (see, e.g., FIG. 2).

Figure 3:
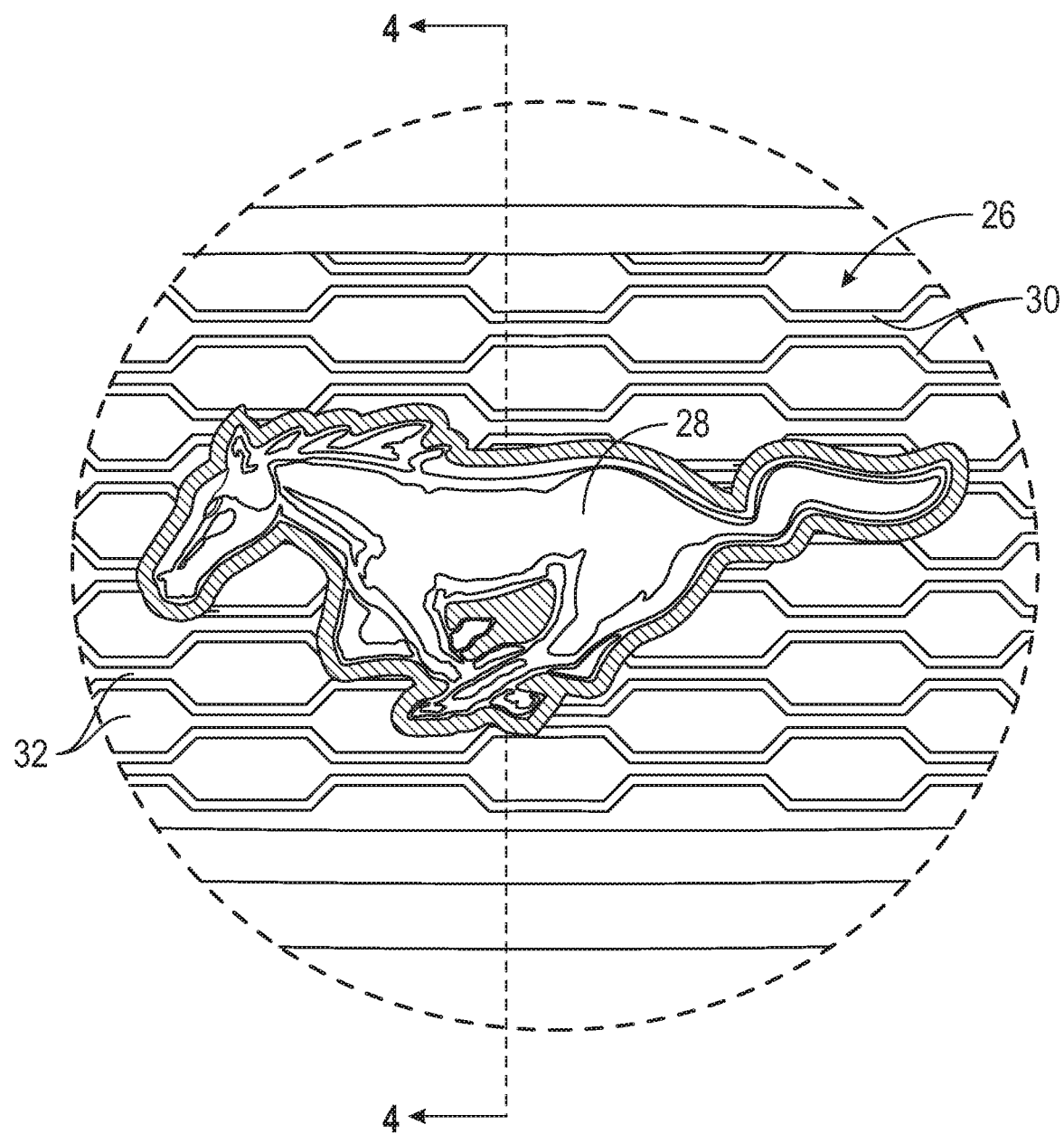
FIG. 3 is a blown up view of the illuminating assembly of FIG. 1.
Figure 4:
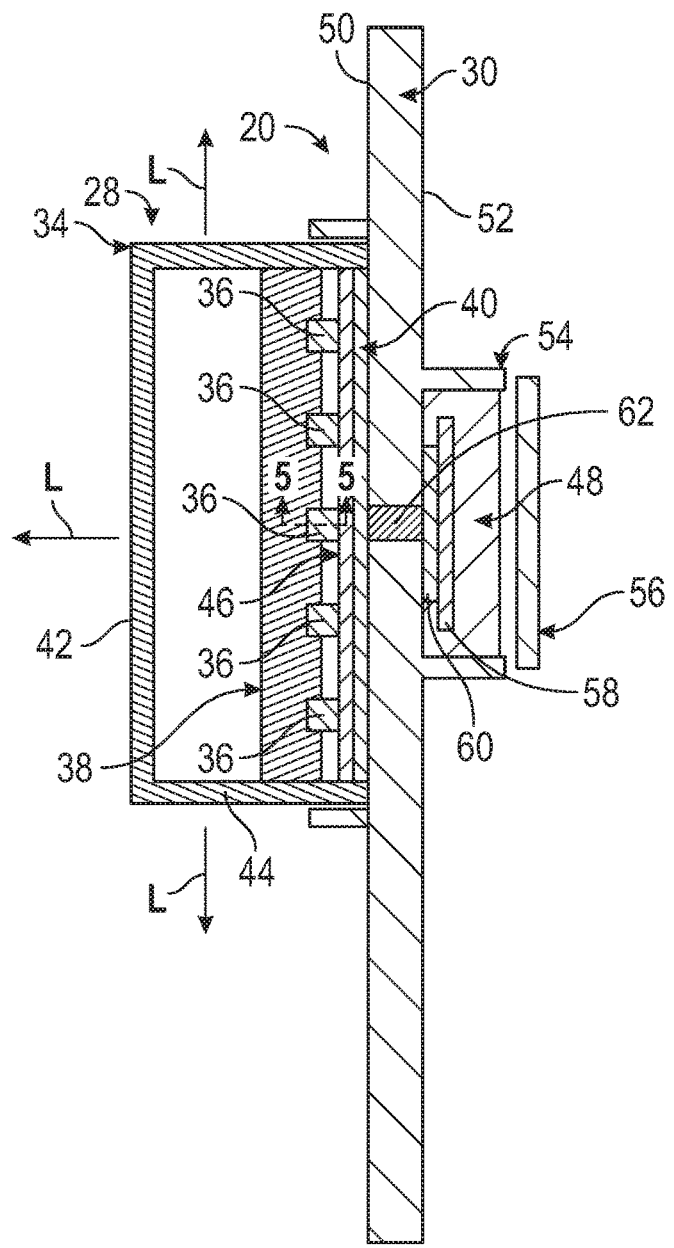
FIG. 4 is a sectional view through the illuminating assembly of FIG. 3.
Figure 5:
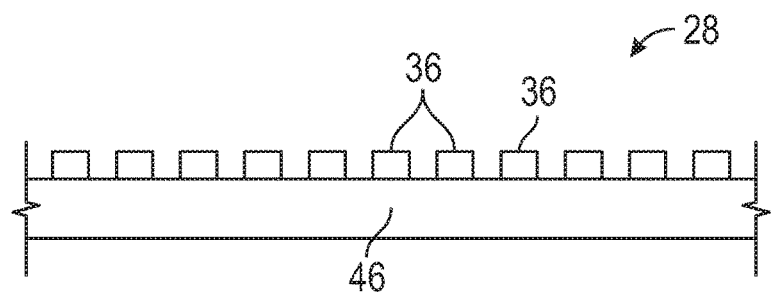
FIG. 5 is a sectional view through a portion of a badge of the illuminating assembly of FIG. 4.

FIGS. 3 through 5, with continued reference to FIG. 1, illustrate additional details of the badge 28 of the illuminating assembly 20. In an embodiment, the badge 28 includes a housing 34, one or more light sources 36, one or more optic devices 38, and a thermal transfer device 40. Although not specifically shown or described, the badge 28 could include additional components such as reflectors, sealing devices, etc.

The housing 34 may be manufactured in a variety of ways. In an embodiment, the housing 34 includes a metallic film 42 and a plastic section 44. The plastic section 44 may be insert molded on or otherwise secured to the back of the metallic film 42. In an embodiment, the metallic film 42 can be applied to the plastic section 44 via partial vacuum deposition.

The metallic film 42 gives the housing 34 a metallic (i.e., chrome-like) appearance. In an embodiment, the metallic film 42 is an aluminum film; however, other metallic films could also be utilized. The metallic film 42 may be light permeable to allow light L from the light sources 36 to escape from the inside to the outside of the housing 34. The metallic film 42 may therefore behave similarly to a two-way mirror.

The plastic section 44 may be constructed from a rigid material that is also light permeable. In an embodiment, the plastic section 44 is constructed from an acrylic material, such as acrylic plastic, for example. However, other plastic materials are also contemplated within the scope of this disclosure. The light L that is ultimately emitted through the plastic section 44 and the metallic film 42 of the housing 34 of the badge 28 provides visual feedback of various operating behaviors of the vehicle 10 to pedestrians and/or operators of other vehicles.

The housing 34 houses each light source 36 and each optic device 38 of the badge 28. The optic device(s) 38 focuses the light emitted by the light source(s) 36, such as in a narrow pattern that can be emitted with a desired directionality through the housing 34. In an embodiment, the optic device 38 is positioned in front of the light sources 36 (i.e., between the light sources 36 and the plastic section 44). In another embodiment, in addition to its various other functions, the plastic section 44 of the housing 34 functions as an additional optic device.

Each light source 36 may be a light emitting diode (LED). In an embodiment, the light source 36 is a multi-colored LED, such as a Red, Green, Blue (RGB) LED, for example. Other light sources could also be utilized within the scope of this disclosure. The light sources 36 may be powered by a vehicle power supply system, for example.

The badge 28 may include a plurality of the light sources 36 arranged in multiple spaced apart rows along a printed circuit board (PCB) 46. The PCB 46 may extend longitudinally inside the housing 34 and could extend across the entire height and length of the badge 28. The light sources 36 may be arranged in multiple rows in both the vertical direction (see FIG. 4) and longitudinal direction (see FIG. 5) of the PCB 46.

The total number of light sources 36 provided within the badge 28 may vary and is vehicle dependent. In an embodiment, the badge 28 includes a sufficient number of light sources 36 for visualizing the combination of lighting effects emitted therefrom during both daytime driving conditions and nighttime driving conditions.

The housing 34 of the badge 28 may be mounted to at least one grille component 30 of the grille assembly 26. In an embodiment, the grille component 30 is a plastic component. Suitable plastic materials include but are not limited to thermally conductive plastics. Heat generated by the light sources 36 of the badge 28 during a light emitting event may be dissipated into the grille component 30. In this way, the grille component 30 acts as a relatively large heat sink for thermally managing the light sources 36.

The heat transfer device 40 may be disposed between the PCB 46 and the grille component 30 once the housing 34 is mounted to the grille component 30. In an embodiment, the heat transfer device 40 is a thermally conductive adhesive. The heat transfer device 40 facilitates heat transfer between the PCB 46 (and thus the light sources 36) and the grille component 30.

Each light source 36 of the badge 28 can be controlled to emit light in response to a command from an illumination control module 48. The control module 48 may be mounted on an opposite side of the grille component 30 from the badge 28. For example, the housing 34 of the badge 28 may be mounted on an external surface 50 of the grille component 30, and the control module 48 may be mounted relative to an internal surface 52 of the grille component 30. In an embodiment, the control module 48 is received within a compartment 54 that is integral to or otherwise secured to the internal surface 52 of the grille component 30. The control module 48 may be sealed within the compartment 54 by a cover 56. In an embodiment, the cover 56 is made of a thermally and electrically conductive plastic.

The control module 48 may include its own printed circuit board (PCB) 58. Another heat transfer device 60 may be disposed between the PCB 58 and the grille component 30 for dissipating heat generated by the control module 48 into the grille component 30. The PCB 58 of the control module 48 may be electrically connected to the PCB 46 of the badge 28 by a connector assembly 62, such as a board-to-board connector assembly.

The control module 48 may be equipped with executable instructions for interfacing with and commanding operation of various components of the illuminating assembly 20, including the badge 28. The control module 48 may include a processing unit and non-transitory memory for executing the various control strategies and modes of the illuminating assembly 20. The processing unit, in an embodiment, is configured to execute one or more programs stored in the memory of the control module 48. A first exemplary program, when executed, may determine when and how to illuminate (or, optionally, not to illuminate) the badge 28 of the illuminating assembly 20. The control module 48 could also control various other functions associated with the illuminating assembly 20 of the vehicle 10.

Each light source 36 of the badge 28 of the illuminating assembly 20 can be selectively controlled either individually or in units to generate various lighting effects that can be emitted by the badge 28 for indicating the different operating behaviors of the vehicle 10. FIGS. 6-12 (with continued reference to FIGS. 1-5) schematically illustrate examples of such operating behaviors. It should be understood that the illustrated operating behaviors are intended as non-limiting examples of the type of visual cues that can be created by the badge 28 of the illuminating assembly 20. Where appropriate, a legend is included in these figures to aid the understanding of each exemplary operating behavior.

Figure 6:
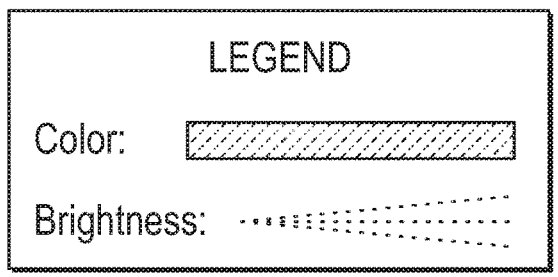
FIG. 6 schematically illustrates a first lighting effect that can be indicated by an illuminating vehicle assembly.
Figure 6:
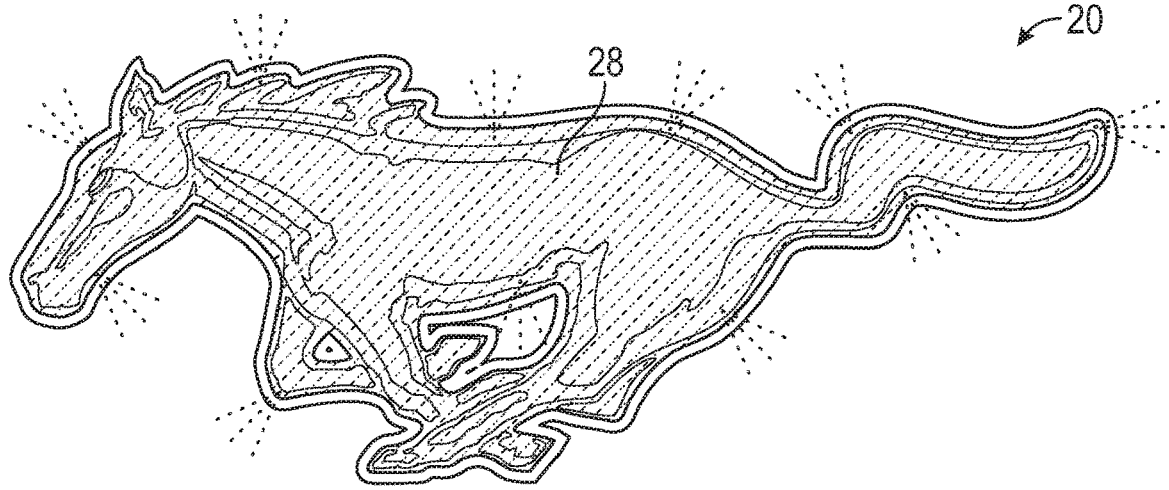

FIG. 6 schematically illustrates a first exemplary lighting effect E1 that can be generated by the badge 28 of the illuminating assembly 20 for indicating a first operating behavior of the vehicle 10. For example, the first lighting effect E1 can be emitted from the badge 28 of the illuminating assembly 20 to indicate, in general, the traveling speed of the vehicle 10.

If the first lighting effect E1 has been commanded by the control module 48, the badge 28 can be illuminated in a specific color at a specific brightness to provide a visual indication of how fast the vehicle 10 is traveling. For example, the badge 28 can emit light having a color (e.g., white) at a specific brightness level. The actual brightness of the emitted light may be tied to the general traveling speed of the vehicle 10. Stated another way, the brighter the badge 28 is lit, the faster the vehicle 10 is traveling.

Figure 7:
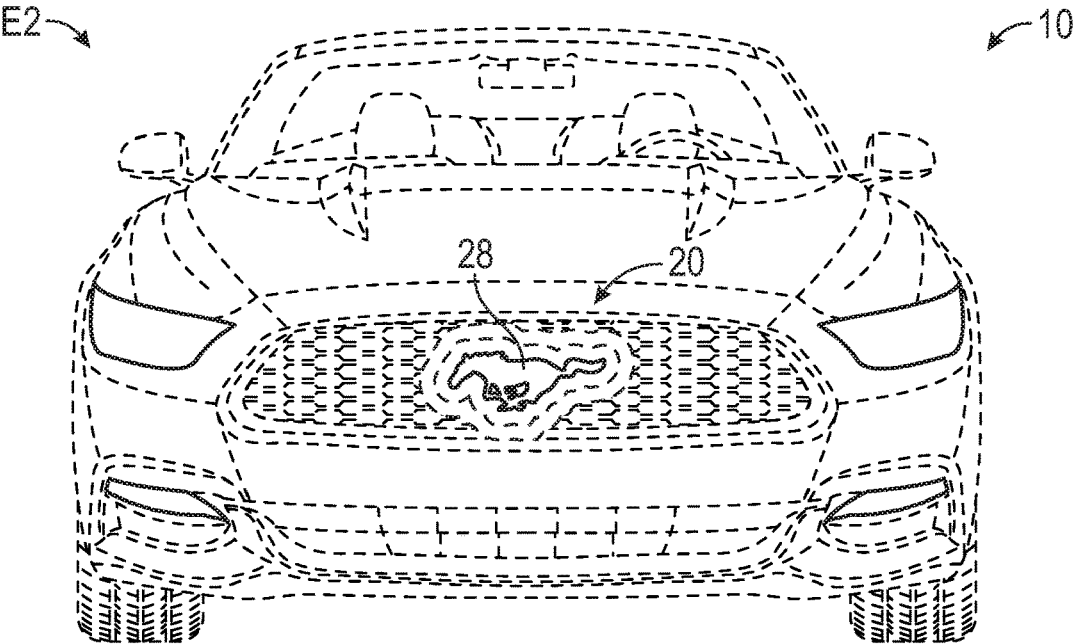
FIG. 7 schematically illustrates a second lighting effect that can be indicated by an illuminating vehicle assembly.

FIG. 7 schematically illustrates a second exemplary lighting effect E2 that can be generated by the badge 28 of the illuminating assembly 20 for indicating another operating behavior of the vehicle 10. For example, the second lighting effect E2 can be emitted from the badge 28 to produce a daytime running light of the vehicle 10. If the second lighting effect E2 has been commanded by the control module 48, the badge 28 can be illuminated to emit light at a specific color and brightness. The light from the badge 28 is continuously emitted during operation of the vehicle 10 for creating the effect of daytime running lights.

Figure 8:
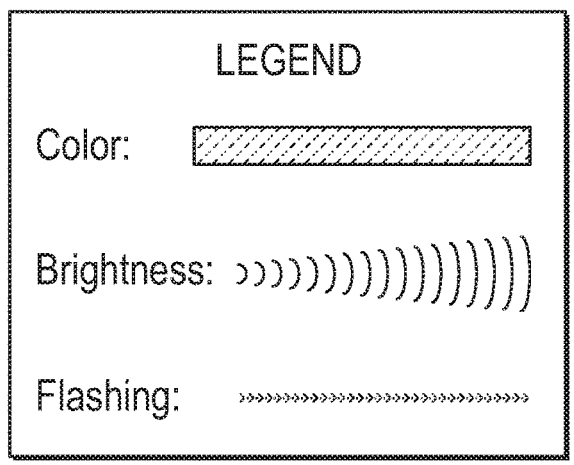
FIG. 8 schematically illustrates a third lighting effect that can be indicated by an illuminating vehicle assembly.
Figure 8:
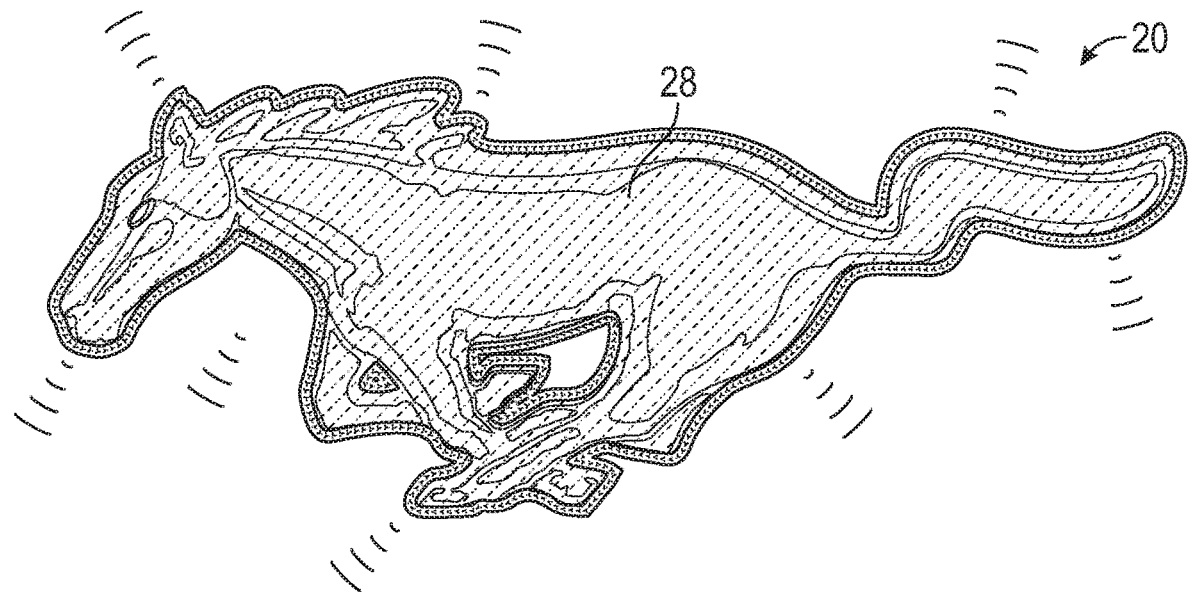

FIG. 8 schematically illustrates a third exemplary lighting effect E3 that can be generated by the badge 28 of the illuminating assembly 20 for indicating yet another operating behavior of the vehicle 10. For example, the third lighting effect E3 can be emitted from the badge 28 to indicate a traction or stability control issue of the vehicle 10 (e.g., vehicle wheels are slipping, ABS warning, traction control warning, stability warning, etc.).

If the third lighting effect E3 has been commanded by the control module 48, the badge 28 may be commanded to emit flashing lights in a specific color (e.g., white) and at a specific brightness. The third lighting effect E3 thus provides a visual indication to pedestrians and other drivers that the vehicle 10 may be experiencing traction or stability control issues.

Figure 9:
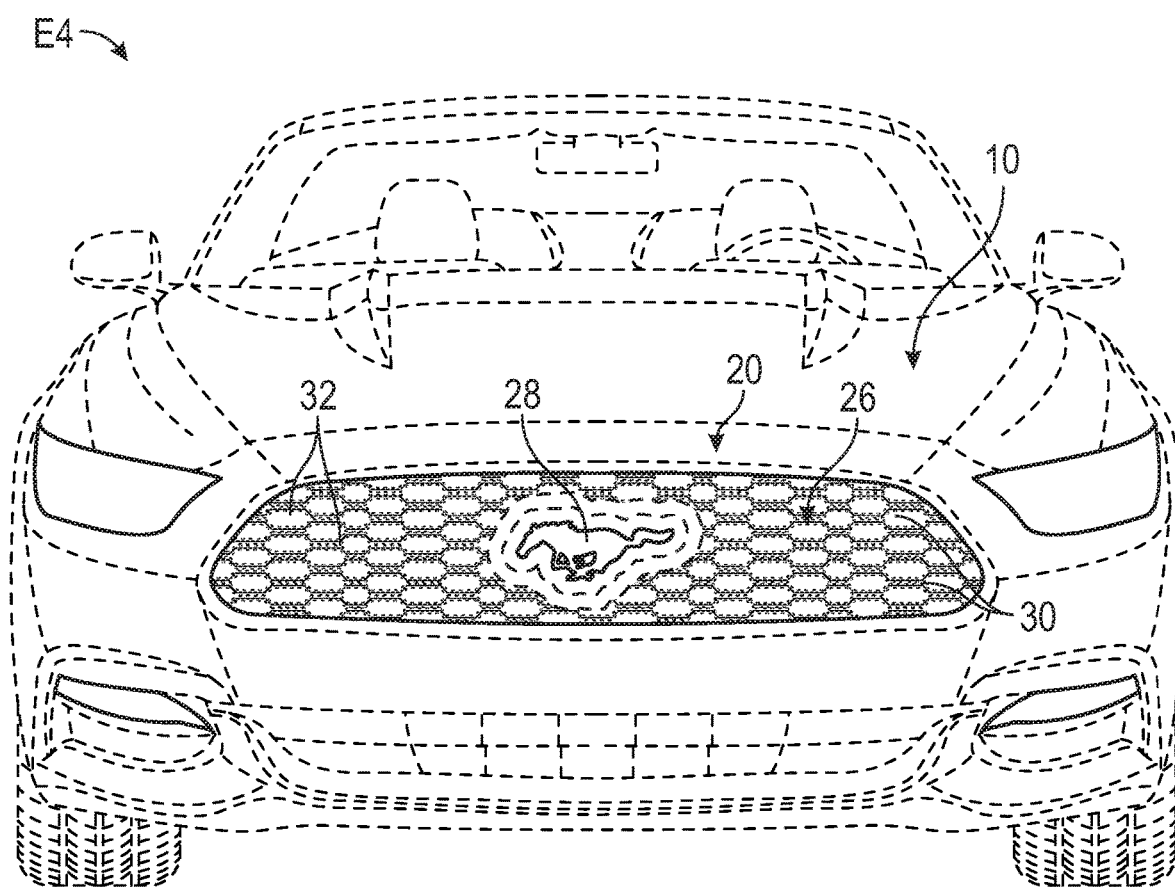
FIG. 9 schematically illustrates a fourth lighting effect that can be indicated by an illuminating vehicle assembly.

FIG. 9 schematically illustrates a fourth exemplary lighting effect E4 that can be generated by the badge 28 of the illuminating assembly 20 for indicating another operating behavior of the vehicle 10. For example, the fourth lighting effect E4 can be emitted by the badge 28 to illuminate the entire grille assembly 26. Some vehicle owners may find such a lighting effect to be aesthetically pleasing.

If the fourth lighting effect E4 has been commanded by the control module 48, the badge 28 may be commanded to emit lights having a desired color and brightness. The lighting emitted by the badge 28 must be of sufficient brightness to illuminate the various openings 32 located between the grille components 30 of the grille assembly 26. The light may be communicated through top, bottom, and side surfaces of the housing 34 of the badge 28 in order to illuminate the grille assembly 26.

The lighting effects E1, E2, E3, and E4 of FIGS. 6-9 may be produced by the badge 28 when the vehicle 10 is in operation and in a drive gear. However, the badge 28 can also be controlled to produce various lighting effects when the vehicle 10 is in park and thus not moving.

Figure 10:
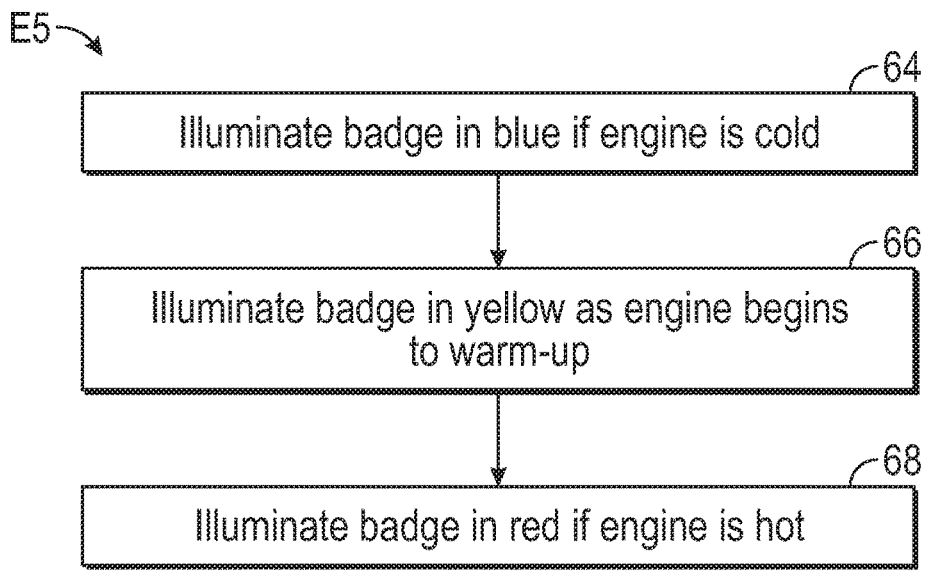
FIG. 10 schematically illustrates a fifth lighting effect that can be indicated by an illuminating vehicle assembly.

For example, a fifth exemplary lighting effect E5 for indicating an operating behavior of the vehicle 10 while parked is illustrated by FIG. 10. The fifth lighting effect E5 can be produced to simulate a temperature gauge for indicating an engine temperature of the vehicle 10.

If the fifth lighting effect E5 is commanded by the control module 48, the badge 28 may be illuminated in a color designed to generally indicate the engine temperature. For example, the badge 28 may be illuminated in blue if the engine is cold (see block 64), may then be transitioned to yellow as the engine heats up (see block 66), and is then illuminated in red when the engine is hot (see block 68). In an embodiment, the lights emitted by the badge 28 during the fifth lighting effect E5 may pulse from left to right or right to left to provide a more visual temperature gauge. In another embodiment, existing engine sensors are utilized to determine the temperature of the vehicle engine.

Figure 11:
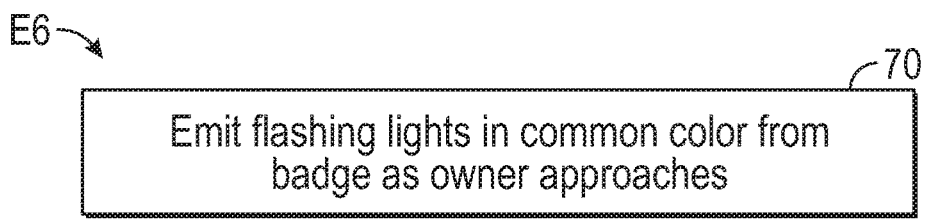
FIG. 11 schematically illustrates a sixth lighting effect that can be indicated by an illuminating vehicle assembly.

FIG. 11 schematically illustrates a sixth exemplary lighting effect E6 that can be generated by the badge 28 for indicating another operating behavior of the vehicle 10 while parked. The sixth lighting effect E6 may be commanded as a trouble indicator, such as if the vehicle 10 has a mechanical issue and requires service.

If the sixth lighting effect E6 has been commanded by the control module 48, each light source 36 of the badge 28 can be controlled to emit flashing lights in a common color (e.g., red) as an authorized owner approaches the vehicle 10. This is schematically illustrated at block 70. The flashing lights indicate to the approaching or departing owner that a vehicle issue exists (e.g., low tire pressure, low fuel, etc.).

Figure 12:
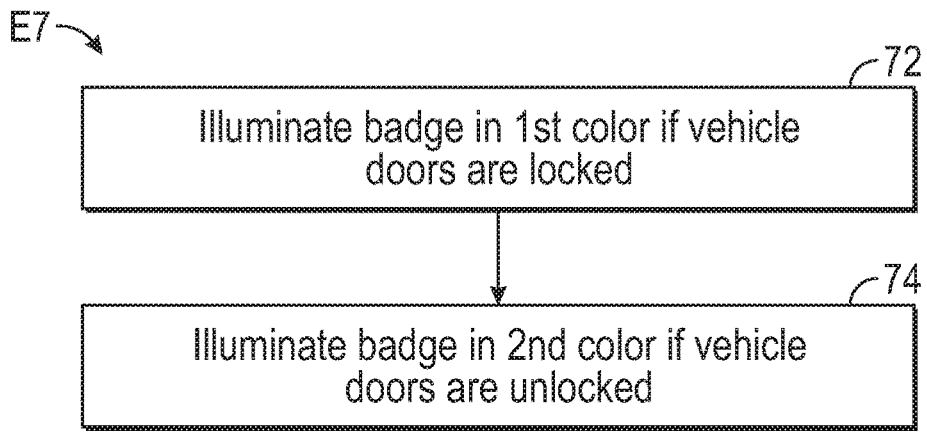
FIG. 12 schematically illustrates a seventh lighting effect that can be indicated by an illuminating vehicle assembly.

FIG. 12 schematically illustrates a seventh exemplary lighting effect E7 that can be generated by the badge 28 for indicating yet another operating behavior of the vehicle 10 while parked. For example, the seventh lighting effect E7 may be commanded to indicate the vehicle door lock status to an owner.

If the seventh lighting effect E7 has been commanded by the control module 48, each light source 36 of the badge 28 can be controlled to emit flashing lights in a first color (e.g., white) if the vehicle doors are locked as the owner moves away from the vehicle (see block 72), and can be controlled to emit flashing lights in a second color (e.g., red) if the vehicle doors are unlocked as the owner moves away from the vehicle 10 (see block 74). The seventh lighting effect E7 thus acts as an auxiliary lock soldier.

The illuminating assemblies described herein communicate a variety of vehicle operating behaviors to persons outside of the vehicle (e.g., pedestrians, bicyclists, operators of other vehicles, etc.) by illuminating a badge of the vehicle. In addition, by mounting the badge to a plastic grille component, the heat generated by the light sources of the badge can be easily dissipated.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle lighting method, comprising:
   illuminating a badge of an illuminating assembly that is mounted to a vehicle, wherein the badge includes a light source; and
   dissipating heat produced by the light source of the badge into a plastic component of a grille assembly that is mounted to the vehicle,
   wherein the badge is illuminated in a manner that provides visual feedback of a plurality of different operating conditions of the vehicle.

2. The method as recited in claim 1, wherein illuminating the badge includes:
   producing a lighting effect that provides a visual indication of a traveling speed of the vehicle.

3. The method as recited in claim 1, wherein illuminating the badge includes:
   producing a lighting effect to produce a daytime running light of the vehicle.

4. The method as recited in claim 1, wherein illuminating the badge includes:
   producing a lighting effect to indicate a traction or stability control issue of the vehicle.

5. The method as recited in claim 1, wherein illuminating the badge includes:
   producing a lighting effect to illuminate openings in the grille assembly.

6. The method as recited in claim 1, wherein illuminating the badge includes:
   producing a lighting effect to simulate a temperature gauge for indicating an engine temperature of the vehicle.

7. The method as recited in claim 1, wherein illuminating the badge includes:
   producing a lighting effect to indicate that a vehicle issue exists.

8. The method as recited in claim 1, wherein illuminating the badge includes:
   producing a lighting effect to indicate whether doors of the vehicle are locked or unlocked.

9. The method as recited in claim 1, wherein the plastic component is a grille bar.

10. The method as recited in claim 1, wherein the badge includes a housing and the light source is housed inside the housing.

11. The method as recited in claim 10, wherein a thermal transfer device is mounted between the light source and the plastic component and is configured to dissipate the heat generated by the light source into the plastic component.

12. The method as recited in claim 11, wherein the thermal transfer device is a thermally conductive adhesive.

13. The method as recited in claim 1, wherein dissipating the heat includes:

dissipating the heat from the badge to the plastic component through a thermal transfer device.

14. The method as recited in claim 13, wherein the thermal transfer device is a thermally conductive adhesive.

15. The method as recited in claim 13, wherein the thermal transfer device is mounted between a printed circuit board of the badge and the plastic component.

16. A vehicle lighting method, comprising:

mounting a badge to an external surface of a plastic grille component that is mounted to a vehicle, wherein the badge includes a light source;

illuminating the light source to emit various lighting effects from the badge for indicating a plurality of visually distinctive operating behaviors of the vehicle; and dissipating heat produced by the light source through a thermal transfer device between the light source and the plastic grille component and then into the plastic grille component.

17. The method as recited in claim 16, wherein the thermal transfer device is a thermally conductive adhesive.

18. The method as recited in claim 16, wherein the thermal transfer device is mounted between a printed circuit board of the badge and the plastic grille component.

19. The method as recited in claim 18, comprising a control module received at an internal surface of the plastic grille component, wherein the control module includes a second printed circuit board.

20. The method as recited in claim 19, comprising a second thermal transfer device between the second printed circuit board and the internal surface.

* * * * *